No. 895,504. PATENTED AUG. 11, 1908.
M. B. SCHENCK.
CASTER.
APPLICATION FILED NOV. 4, 1907.
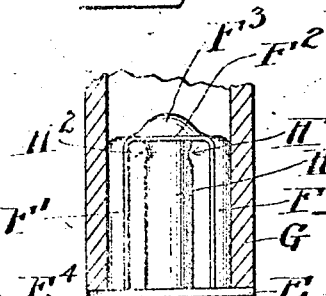
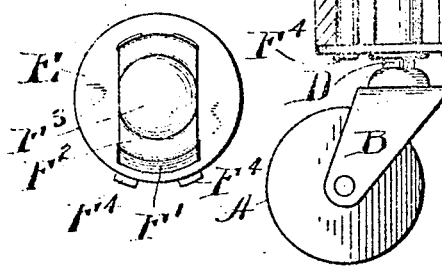
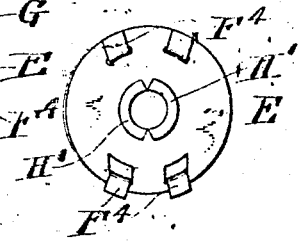
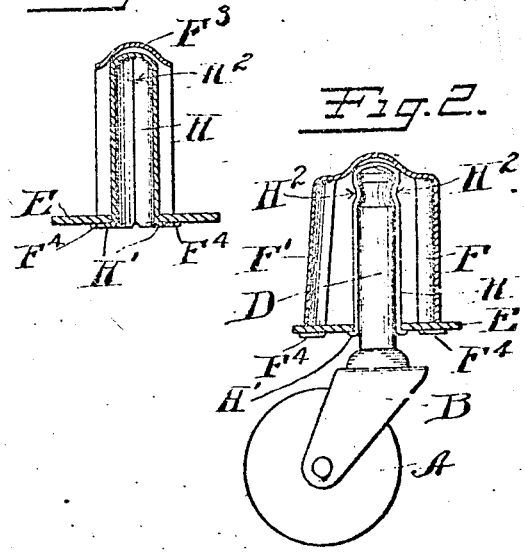
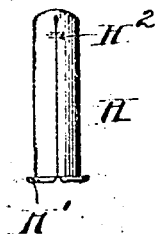
Witnesses:
Chas. A. Peard
Langdon Moore
Inventor
M. B. Schenck
By his Attorneys
Bartlett Brownell Mitchell

UNITED STATES PATENT OFFICE.

MARTIN B. SCHENCK, OF MERIDEN, CONNECTICUT.

CASTER.

No. 895,504.  Specification of Letters Patent.  Patented Aug. 11, 1908.

Application filed November 4, 1907. Serial No. 400,454.

*To all whom it may concern:*

Be it known that I, MARTIN B. SCHENCK, a citizen of the United States, residing at Meriden, county of New Haven, State of Connecticut, have invented certain new and useful Improvements in Casters, of which the following is a full, clear, and exact description.

My invention relates to certain new and useful improvements in casters in which the parts are made of metal and are so constructed as to permit the caster proper to be readily attached or detached from the socket, so as to permit the caster wheel to rotate on its own axis and at the same time rotate in the socket as the furniture is moved to and fro in different directions.

The object of the invention is to produce a simple, inexpensive and effective device in which the bearing of the socket within the furniture leg is such as to afford an effective support for the caster, and in which the caster is so associated with the socket that it may be readily attached or detached at will, the weight of the furniture, when the parts are assembled, being carried directly on the upper end of the caster pintle rather than on the lower end thereof, as in the ordinary construction.

In the drawings, Figure 1 is a section of the lower end of the furniture leg, with my improved caster socket and caster in place, the socket and caster being shown in side elevation. Fig. 2 is a vertical section of the caster socket detached and illustrating the position of the caster in side elevation. Fig. 3 is a plan view of the socket. Fig. 4 is a view of the under side thereof. Fig. 5 is a vertical section thereof. Fig. 6 is a side view of the center guide and caster retainer, detached.

A is the caster wheel. B is a bracket, of the usual form, pivotally supporting said wheel.

D is the pintle or spindle projecting upward from the bracket B.

The socket is preferably formed of three separate pieces. One of these pieces I will term the "washer", another the "frame" and still another the "center guide or caster retainer". E represents the said "washer", the same surrounding the lower part of the pintle D. The "frame" is preferably formed of a strip of metal shaped by suitable dies or punches, so as to double the material to form two sides F F', connected at their upper ends as at F². The sides F F' are semi-circular or curved, so as to present a broad convex bearing surface of substantial length and corresponding to the bore of the furniture leg into which the socket is to be pushed. The "center guide and pintle retainer" is indicated at H, and is formed of a strip of metal doubled at its upper end, as best seen in Fig. 6, the sides being semi-circular or curved and of an internal diameter but slightly greater than the diameter of the pintle D. The part F² of the "frame" has a central pressed-up portion F³ which receives and centers the upper end of the center guide and pintle retainer H. The lower end of the part H may be suitably secured to the washer E, as by a flange H'. The lower ends of the side members F F' may be formed integrally with the washer E, or secured thereto in any desired manner, as by tangs F⁴.

The center guide or pintle retainer may have indentations, as indicated at H² H², preferably at the edges of the side seams formed by folding the metal, the purpose of said indentations being to form inward projections or nibs which are to frictionally lock the pintle D in place, a recess being formed in said pintle to register with the indentations H² when the parts are assembled. In practice the upper extremity of the pintle will take a bearing in the upper end of the retainer H and the load will be carried thereon. Lateral displacement will be prevented by the engagement of the pintle with the centering member H at its upper and lower ends.

As shown in Fig. 4, one set of the openings through which the tangs F⁴ project are sufficiently wide to permit one side (F') of the socket to yield sufficiently to enable the socket to be pushed into the opening in the lower end of the furniture leg, so that by an outward expansive action the accidental detachment of the socket itself will be prevented. The semi-circular or convex shape of the side members F'-affords a broad surface bearing between the caster socket and the inner wall of the furniture leg, so that an effective support will be afforded. Whereas the side members F F' are shown as comparatively narrow, the width of said members may be increased to any extent desired without departing from the spirit or scope of my invention. These side members F F' are of such diameter as to fit in the bore into which it is desired to insert one of these casters, and this diameter may be varied at will to suit varying conditions.

By the present construction the centering and retaining device H furnishes at once a guide and detachable retainer for the caster without regard to the diameter of the socket, as determined by the width of or space between the side members F F'.

By reason of the construction of the pintle guide H a solid bearing is provided at the inner end thereof to furnish a durable and effective bearing to sustain the weight of the furniture on the upper end of the pintle. By forming the locking nibs H² adjacent to the seams in the sides of the pintle guide, sufficient elasticity is provided to permit the bulbous end of the pintle to be pushed into place readily or withdrawn with equal ease. At the same time, these locking devices are sufficiently non-yielding to prevent any accidental detachment or falling out of the caster proper should the furniture leg be raised from the floor.

From the foregoing it will be seen that whereas the part H serves to guide and center the pintle and prevent it from accidentally falling out should the furniture be lifted, the frame outside of the part H serves to hold the latter from accidental disengagement from the furniture leg under similar conditions. When the parts are assembled, the lower end of the leg G rests upon the washer E around the semi-circular side pieces F—F'.

What I claim is:

1. In a caster socket, a washer-like base, a frame including two side members, one of which is laterally yielding, said side members being united at the top, a central guide and pintle retainer between said washer and the part connecting the upper ends of said side members and a pintle bearing at the upper end of said central guide arranged to take the upward thrust of a pintle.

2. In a caster socket, a washer-like base, a frame including two side members, one of which is laterally yielding, said side members being united at the top, a central guide and pintle retainer between said washer and the part connecting the upper ends of said side members, and a recess in the said connecting part receiving the upper end of said centering device.

3. In a caster socket, a washer-like base, a spring frame including two side members, a connection for the upper ends of said side members, the lower ends of said side members being connected to said washers, a recess in said upper connection, and a pintle guide central with respect to said washer, said pintle guide being held from lateral displacement partly by said washer and partly by a bearing in the recess in the upper end of said frame.

4. In a caster socket, a central pintle guide and retainer, a washer at the lower end thereof, a spring frame carried by said washer overstanding said pintle guide and comprising a yielding frame having two side members one of which is laterally yielding and a bearing at the upper end of said pintle guide arranged to take the upward thrust of a pintle.

5. A three-part caster socket comprising a washer at the lower end thereof, a frame, and a central pintle guide, said pintle guide being slitted through along opposite sides and having a solid top to form an overstanding bearing for the upper end of the caster pintle to take the upward thrust thereof.

6. A three-part caster socket comprising a washer at the lower end, a frame and a central pintle guide mounted on said washer, said pintle guide being slitted through along opposite sides and having a solid top to form a bearing for the upper end of the caster pintle, the side of said guide adjacent one of said slits being pressed in to form a pintle locking shoulder.

7. A three-part caster socket comprising a washer at the lower end, a frame and a central pintle guide mounted on said washer, said pintle guide being slitted through along opposite sides and having a solid top to form a bearing for the upper end of the caster pintle, the opposite sides of said pintle guide adjacent to said slits being pressed in to form a plurality of pintle retainers.

8. In a caster socket, a pintle guide, means for detachably holding the pintle therein, a frame external of said pintle guide at the sides thereof for detachably holding said pintle guide in the furniture leg, and means for receiving and supporting the lower end of the furniture leg on said socket and a connection between said leg supporting means and the sides of the frame.

MARTIN B. SCHENCK.

Witnesses:
WILLIAM C. DREW,
MAURICE C. LANGE.